(12) United States Patent
Coker et al.

(10) Patent No.: US 9,864,879 B2
(45) Date of Patent: Jan. 9, 2018

(54) SECURE SUBSYSTEM

(71) Applicant: MICRON TECHNOLOGY, INC., Boise, ID (US)

(72) Inventors: Kenny T. Coker, Firestone, CO (US); David A. Pohm, Windsor, CO (US); Stephen P. Van Aken, Boulder, CO (US); Michael B. Danielson, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/876,600

(22) Filed: Oct. 6, 2015

(65) Prior Publication Data
US 2017/0098102 A1    Apr. 6, 2017

(51) Int. Cl.
*H04L 29/06*     (2006.01)
*G06F 21/78*     (2013.01)
*G06F 21/60*     (2013.01)

(52) U.S. Cl.
CPC .............. *G06F 21/78* (2013.01); *G06F 21/60* (2013.01); *G06F 21/602* (2013.01)

(58) Field of Classification Search
CPC ....................................................... G06F 21/78
See application file for complete search history.

(56) References Cited

U.S. PATENT DOCUMENTS

| | | | |
|---|---|---|---|
| 7,069,404 B1 * | 6/2006 | Roche ................. | G06F 12/1433 711/163 |
| 8,171,309 B1 | 5/2012 | Poo et al. | |
| 8,332,931 B1 * | 12/2012 | Tran ....................... | G06F 21/74 726/17 |
| 8,495,443 B1 * | 7/2013 | Yu .................. | G01R 31/318588 714/729 |

(Continued)

FOREIGN PATENT DOCUMENTS

| | | |
|---|---|---|
| TW | 201203108 A | 1/2012 |
| TW | 201426537 A | 7/2014 |

OTHER PUBLICATIONS

International Search Report and Written Opinion received for PCT Appl. No. PCT/US2016/054106 dated Jan. 13, 2017.

(Continued)

*Primary Examiner* — Shawnchoy Rahman
(74) *Attorney, Agent, or Firm* — Dorsey & Whitney LLP

(57) ABSTRACT

An apparatus for performing secure operations with a dedicated secure processor is described in one embodiment. The apparatus includes security firmware defining secure operations, a processor configured to execute the security firmware and perform a set of operations limited to the secure operations, and a plurality of secure hardware registers, accessible by the processor and configured to receive instructions to perform the secure operations. An apparatus for performing secure operations with a plurality of security assist hardware circuits is described in another embodiment. The apparatus comprises one or more secure hardware (Continued)

registers configured to receive a command to perform secure operations and one or more security assist hardware circuits configured to perform discrete secure operations using one or more secret data objects.

25 Claims, 6 Drawing Sheets

(56) References Cited

U.S. PATENT DOCUMENTS

| | | | |
|---|---|---|---|
| 8,566,616 B1 * | 10/2013 | Langhammer | G06F 21/10 326/37 |
| 9,177,176 B2 | 11/2015 | Chen | |
| 9,405,707 B2 | 8/2016 | Sarangdhar et al. | |
| 2011/0044451 A1 * | 2/2011 | Anzai | G06F 21/51 380/45 |
| 2014/0037093 A1 | 2/2014 | Park et al. | |
| 2014/0089617 A1 | 3/2014 | Polzin et al. | |
| 2014/0310536 A1 | 10/2014 | Shacham | |

OTHER PUBLICATIONS

First Office Action dated Nov. 17, 2017 for Taiwanese Application No. 105132311.

* cited by examiner

SECURE SUBSYSTEM

BACKGROUND

Data security is a priority in the manufacture of storage systems such as solid state drives (SSDs), hard disk drives (HDDs), tape drives, optical drives, etc. Preventing access to secret data objects, such as encryption keys, provides individuals, businesses, and governments with confidence in the ability of the storage systems to adapt to increasing amounts of electronically stored information without sacrificing security. Traditional storage systems integrate a controller on a single system on chip (SOC) design that includes a processor for performing secure operations, firmware for accessing and performing operations on secret data objects, and secure information, such as encryption keys, stored within an internal SOC memory. In such configurations, the boundary (e.g., the various connections and means of accessing the components of the SOC) of the SOC is the smallest boundary in which secret data objects, such as encryption keys or keys that are used to derive encryption keys, may be guaranteed secure. That is, secret data objects are only as secure as the SOC, and any device that can access the components of the SOC (e.g., the processor) can also access the secret data objects.

DETAILED DESCRIPTION

This disclosure recognizes that traditional data storage systems suffer from certain security related shortcomings. For example, traditional systems use one or more common microprocessors, which are subject to commands from both security firmware and unsecure storage system firmware. Because the system resources that handle secret information and perform secure operations are accessible by any firmware running on the system microprocessor, secret information is just as susceptible to manipulation by storage system firmware as security firmware. Therefore, when ensuring the security of the system, the entire SOC, including any non-security related components, must meet any security requirements, because unauthorized access to unsecure components could result in compromising secret information and lead to security breaches. Embodiments disclosed herein are directed to a security subsystem which isolates components that perform secure operations and handle secure information from general purpose components while limiting communication between secure and unsecure components in order to protect against unauthorized access of secret data objects.

Figure 1:
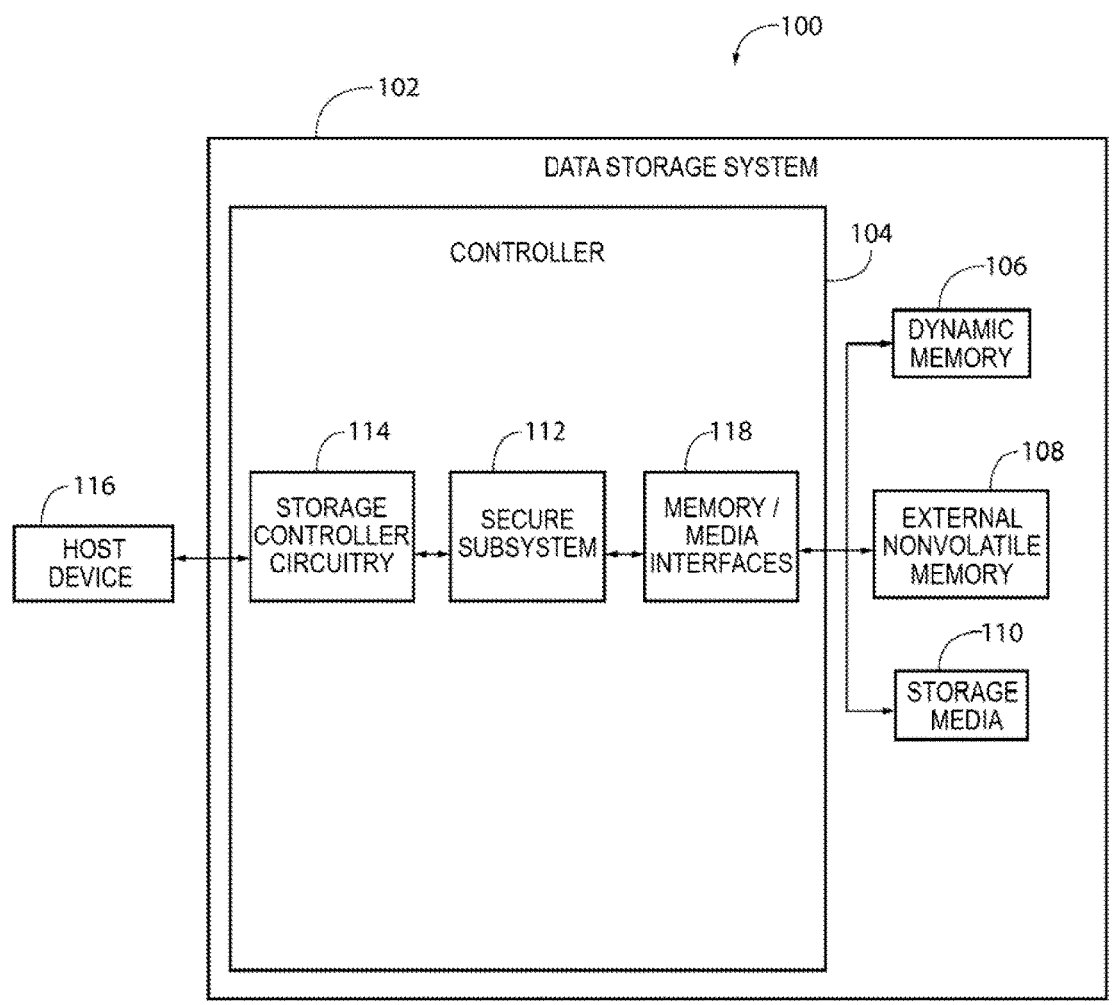
FIG. 1 is a functional block diagram of an apparatus including a data storage system, in accordance with an embodiment of the present invention.

Turning now to the figures, FIG. 1 is a functional block diagram of an apparatus (e.g., an integrated circuit, a memory device, a memory system, an electronic device or system, a smart phone, a tablet, a computer, a server, etc.), generally designated 100. The apparatus 100 includes a data storage system 102, in accordance with an embodiment of the present invention. The data storage system 102 is a memory system capable of performing secure data operations, such as data encryption and decryption. The data storage system 102 may also store and retrieve data, including encrypted data, in one or more memories or storage media. The data storage system 102 generally includes a controller 104, dynamic memory 106, external (to the controller) nonvolatile memory 108, storage media 110, and may be connected to a host device 116.

Controller 104 may be any combination of components capable of executing secure operations and storing secret data objects, such as encryption keys within a secure subsystem. Controller 104 may limit communication between system components and secure components based on the purposes of the components and the operations to be performed. To effect such limited communication, the controller 104 includes storage controller circuitry 114, a secure subsystem 112, and memory/media interfaces 118. In various embodiments, the secure subsystem 112, storage controller circuitry 114, and/or memory/media interfaces 118 may be parts of a single integrated circuit, where the boundaries between are defined by circuit connections. In other embodiments, the secure subsystem 112 may be a discrete circuit or chip that can be connected to the storage controller circuitry 114 and/or the memory/media interfaces 118. The secure subsystem 112 may include a number components configured to perform secure operations and store secret data. The secure subsystem 112 may include a number of system components for performing general security operations which implicate secret data objects.

The secure subsystem 112 may include, for example, a dedicated secure processor, secure hardware registers, security assist hardware, security firmware, components for performing encrypt and decrypt operations, and internal storage, such as random access memory (RAM) and/or non-volatile memory. The storage controller circuitry 114 may include a number of system components for performing general controller operations which do not implicate secret data objects. The storage controller circuitry 114 may include, for example, one or more processing elements, system hardware registers, system firmware, system assist hardware, host, memory, and media interfaces, and/or read and write data path control circuits. The memory/media interfaces 118 may include one or more interfaces to enable communication between the secure subsystem 112 and one or more external storage devices (e.g., dynamic memory 106, external nonvolatile memory 108, and/or storage media 110). Detailed embodiments of the controller 104 are discussed in further detail below with respect to FIGS. 2 and 4.

The dynamic memory 106 may be, for example, dynamic random access memory (DRAM). The dynamic memory 106 may be accessible by the controller 104 via the memory/media interfaces 118. One or more of the components of the controller 104, such as the secure subsystem 112 and/or the storage controller circuitry 114 may be able to access the dynamic memory 106 via the memory/media interfaces 118. The controller 104 may store and/or retrieve data on the dynamic memory 106. In various embodiments, the dynamic memory 106 may have stored thereon encrypted data, such as program instructions or other information for use by the controller 104 including one or more subsystems within the controller 104 (e.g., secure subsystem 112 and/or memory access circuitry 114). The external nonvolatile memory 108 may be, for example, a flash memory device, such as NOR flash. The external nonvolatile memory 108 may be accessible by the controller 104, including one or more subsystems of the controller 104, such as secure subsystem 112 and/or the storage controller circuitry 114. The controller 104 may store and/or retrieve data on the external nonvolatile memory 108. In various embodiments, the external nonvolatile memory 108 may have stored thereon encrypted data, such as program instructions or other information for use by the controller 104, including by one or more subsystems within the controller 104 (e.g., secure subsystem 112 and/or storage controller circuitry 114).

The storage media 110 can include a number of arrays of memory cells (e.g., non-volatile memory cells). The arrays can be flash arrays with a NAND architecture, for example. However, embodiments are not limited to a particular type of memory array or array architecture. The memory cells can be grouped, for instance, into a number of blocks including a number of physical pages. A number of blocks can be included in a plane of memory cells and an array can include a number of planes. As one example, a memory device may be configured to store 8 KB (kilobytes) of user data per page, 128 pages of user data per block, 2048 blocks per plane, and 16 planes per device.

In operation, data can be written to and/or read from storage media 110 as a page of data, for example. Data can be sent to/from a host (e.g., host device 116) in data segments referred to as sectors (e.g., host sectors) that are mapped on to page units. The secure subsystem 104 may perform any encrypting or decrypting necessary to facilitate data transfer between the storage media 110 and the host device 116, while ensuring that all secret data objects (e.g., encryption/decryption keys) remain within the secure subsystem 112.

The host device 116 may be any host system such as a personal laptop computer, a desktop computer, a tablet computer, a smart phone, a personal digital assistant, or any other programmable electronic device capable of using and/or creating secret information. In various embodiments, the host device 116 may provide data to be written to storage media 110 or request data from storage media 110 via data storage system 102. The controller 104 may receive the requests and perform the requested functions using one or more subsystems, such as secure subsystem 112 and/or storage controller circuitry 114 such that secret data objects remain within the secure subsystem 112 and are not accessible by any systems or components external to the secure subsystem 112.

Figure 2:
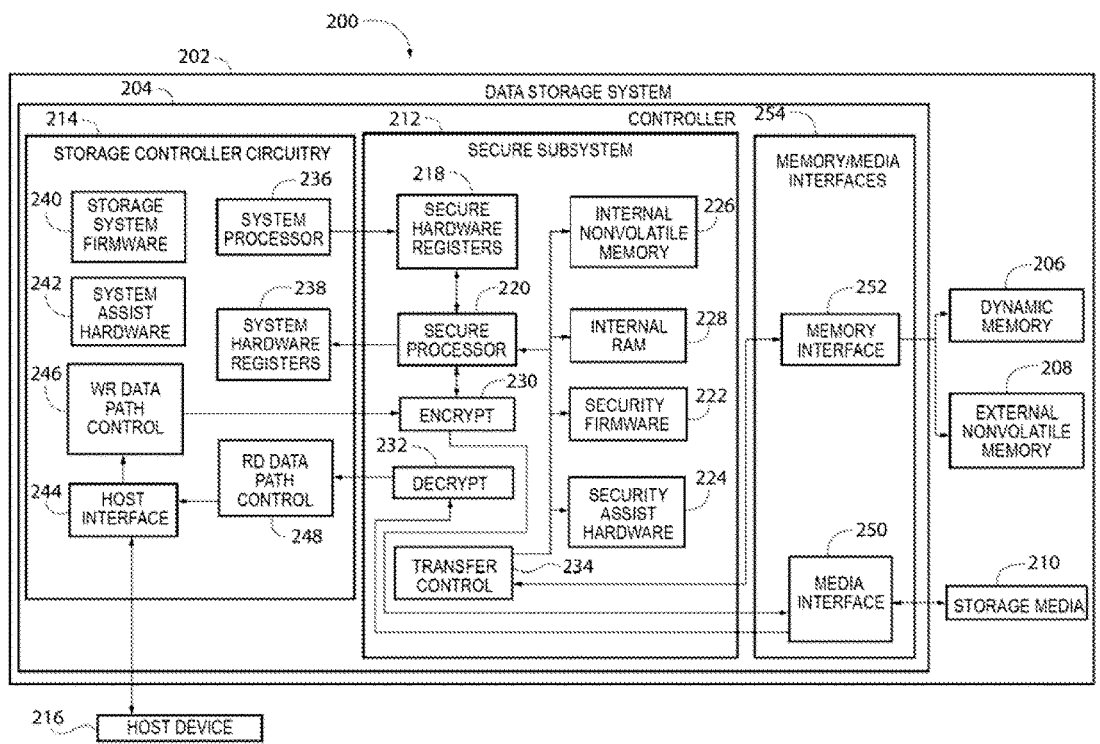
FIG. 2 is a functional block diagram of an apparatus including a data storage system with a secure subsystem, in accordance with an embodiment of the present invention.

FIG. 2 is a functional block diagram of an apparatus, generally designated 200, including a data storage system 202, in accordance with an embodiment of the present invention. The data storage system 202 generally includes a controller 204 having a secure subsystem 212, storage controller circuitry 214, and memory/media interfaces 254, a dynamic memory 206, an external nonvolatile memory 208, and storage media 210. A host device 216 may be coupled to the data storage system 202. In various embodiments, the apparatus 200 may be implemented as the apparatus 100 described above with respect to FIG. 1. Specifically, the dynamic memory 206, external nonvolatile memory 208, storage media 210, and host device 216 may each be implemented as described above with respect to dynamic memory 106, external nonvolatile memory 108, storage media 110, and host device 116, respectively, in FIG. 1.

The controller 204 may include a number of components for performing operations, including secure operations which result in and/or manipulate secret data, related to data storage and retrieval. The components of the controller 204 may include a secure subsystem 212 for performing secure operations, such as encryption and decryption of data, and manipulating secret data objects, such as encryption keys. In one embodiment, the secure subsystem 212 is a self-contained integrated circuit or chip instantiated inside of the controller 204. In another embodiment, the secure subsystem 212 may be an integrated circuit subsystem of an SOC. The secure subsystem 212 may be enclosed by a secure boundary, which may be a physical boundary and/or may be defined by the number and types of connections between the secure subsystem 212 and other components of the data storage system 202. The controller 204 may further include storage controller circuitry 214 for performing controller functions which do not require access to secret data objects. For example, the storage controller circuitry 214 may provide an interface for communication between the data storage system 202 and the host device 216. For example, the storage controller circuitry 214 may receive incoming read and write requests and request that secure operations be performed by the secure subsystem 212.

The memory/media interfaces 254 may generally include one or more interfaces to enable communication with one or more external storage devices (e.g., dynamic memory 206, external nonvolatile memory 208, and/or storage media 210). The memory/media interfaces 254 may include the memory interface 252 and the media interface 250. The memory interface 252 provides an interface between the transfer control 234 of the secure subsystem 212 and the dynamic memory 206 and/or the external nonvolatile memory 208. As described above, some secret data objects may be encrypted and stored external to the secure subsystem 212 so long as the key to decrypt the secret data objects remains stored within the secure subsystem 212 or is itself encrypted for storage outside of the secure subsystem 212. The memory interface 252 may be a communication interface between the transfer control 234 and therefore may be controlled by the secure subsystem 212 despite being located external to the secure subsystem. The memory interface 252 may also be controlled, for example, by one or more components of the storage controller circuitry 214. The media interface 250 may access the storage media 210 on behalf of the host device 216 via commands (e.g., read/write commands) issued to the host interface 244. The media interface 250 may allocate storage, access, read data, write data, erase data, and/or perform other management operations with respect to the storage media 210.

In the embodiment of FIG. 2, the secure subsystem 212 includes secure hardware registers 218, a secure processor 220, security firmware 222, security assist hardware 224, internal nonvolatile memory 226, internal RAM 228, an encrypt circuit 230, a decrypt circuit 232, and a transfer control circuit 234. The secure hardware registers 218 may include a plurality of hardware registers. In various embodiments, the secure hardware registers 218 may be general purpose registers in a register file. A subset of the secure hardware registers 218 may be accessible by one or more components that are external to the secure subsystem 212, such as one or more components of the storage controller circuitry 214 (described below). The external components may write information such as commands and or data for performing secure operations within the secure subsystem 212 to the subset of the secure hardware registers 218. While access by external components to the secure hardware registers 218 may be limited to a subset for the secure hardware registers 218, components internal to the secure subsystem 212 (e.g., the secure processor 220) may access all of the secure hardware registers 218. In various embodiments, the secure hardware registers 218 may be configured to notify the secure processor 220 executing security firmware 222 that a request for a secure operation to be performed by the secure processor 220 was received.

In the embodiment of FIG. 2, the secure subsystem 212 includes the secure processor 220, which may be a dedicated processor or microcontroller for performing secure operations that involve, create, and/or manipulate secret data objects, such as encryption keys. In various embodiments, the secure processor 220 may be a general purpose processor or a special purpose processor capable of performing secure operations. The secure processor 220 may access the secure hardware registers 218 in order to receive commands and/or data for performing secure operations within the secure subsystem 212. The secure processor 220 may access and execute security firmware 222. In various embodiments, the security firmware 222 may control the operations that the secure processor 220 can perform. For example, the security firmware 222 may define the complete set of secure operations that the secure processor 220 may perform. The secure processor may be configured to perform operations limited to the set of secure operations defined by the security firmware 222. The security firmware 222 may also define the components with which the secure processor 220 may communicate, both within the secure subsystem 212 and external to the secure subsystem 212.

The security assist hardware circuit 224 may provide hardware execution of various discrete operations performed by the secure subsystem 212. Those skilled in the art will appreciate that various embodiments of the apparatus 200 may include any number of security assist hardware circuits 224, or no security assist hardware circuits 224. The security assist hardware circuit 224 may include various circuits for performing specific functions including, but not limited to, data encryption and decryption, signature calculation and checking, and/or random number generation. Such operations may be steps in processes executed to fulfill the operational requirements of the secure subsystem 212. As such, the security assist hardware circuit 224 may include various hardware submodules, each of which may be controlled by the security firmware 222 being executed by the secure processor 220. The operations performed by the security assist hardware circuit 224 may be component operations of secure operations, such as client authentication, encryption key generation, key identification, key selection, and retrieval. In various embodiments, the security assist hardware circuit 224 is controlled entirely by the security firmware 222 executing on the secure processor 220 so that any data provided to or by the security assist hardware circuit 224 is not accessible from outside of the secure subsystem 212.

In the embodiment of FIG. 2, the internal nonvolatile memory 226 and internal RAM 228 may provide internal memories for use by various components in the secure subsystem 212. Both internal nonvolatile memory 226 and internal RAM 228 may be accessed by the secure processor 220 executing the security firmware 222. The internal nonvolatile memory 226 may contain secret data objects or other information that may need to be persistent across power down and power up cycles. The internal RAM 228 may buffer data used by components of the secure subsystem 212. For example, the internal RAM 228 may receive encrypted secret data objects from external storage (e.g., dynamic memory 206 and/or external nonvolatile memory 208) or buffer encrypted secret data objects for storage in external storage (e.g., dynamic memory 206 and/or external nonvolatile memory 208). Secret data objects may be stored external to the secure subsystem 212 if the secret data objects are first encrypted by a secret encryption key that remains within the secure subsystem 212. In various embodiments, the internal RAM 228 may communicate with the dynamic memory 206 and/or external nonvolatile memory 208 via a transfer control circuit 234. The transfer control circuit 234 may provide an interface for data transfer between the secure subsystem 212 and external systems, such as the storage controller circuitry 214, dynamic memory 206, and/or external nonvolatile memory 208 via the memory interface 252. Those skilled in the art will appreciate that various embodiments may not include the internal nonvolatile memory 226 and internal RAM 228. In such embodiments, the secure subsystem 212 may encrypt secret information for storage external to the secure subsystem 212, for example, in dynamic memory 206 and/or external nonvolatile memory 208.

Encrypt circuit 230 and decrypt circuit 232 may reside inside of the secure subsystem 212 and perform encryption and decryption functions, respectively, on data provided by (e.g., during a write operation) or requested by (e.g., during a read operation) the storage controller circuitry 214. In various embodiments, the encrypt circuit 230 receives data for encryption from the storage controller circuitry 214. The secure processor 220, executing the security firmware 222, provides the encrypt circuit 230 with an encryption key (e.g., an encryption key stored in internal nonvolatile memory 226). The encryption circuit 230 may encrypt the received data using the provided encryption key and provide the encrypted information to the media interface 250 in the memory/media interfaces 254 to be stored in storage media 210. By performing the encryption function within the secure subsystem 212, all secret data objects (e.g., the encryption key) remains within the secure subsystem 212 and inaccessible to components outside of the secure boundary that defines the secure subsystem 212. The decrypt circuit 232 operates in a similar manner. Specifically, the decrypt circuit 232 receives a request to retrieve encrypted data stored in the storage media 210. The decrypt circuit retrieves the encrypted data from the storage media 210 via the media interface 250. The secure processor 220 executing the security firmware 222 provides the decryption key to the decrypt circuit 232. The decrypt circuit 232 decrypts the requested data using the provided decryption key and provides the decrypted data to the storage controller circuitry 214. By performing the decryption function within the secure subsystem 212, any secret data objects (e.g., the decryption key) remains within the secure subsystem 212 and inaccessible to components outside of the secure boundary that defines the secure subsystem 212.

In the embodiment of FIG. 2, the storage controller circuitry 214 includes one or more system processors 236, system hardware registers 238, storage system firmware 240, system assist hardware 242, a host interface 244, a write data path control circuit 246, and a read data path control circuit 248. The system processor can be one or more general purpose processors or one or more specialized processors or microcontrollers for performing operations that do not implicate secret data objects and communicating with the secure subsystem 212. The system processor 236 may provide commands and/or information (e.g., command parameters) to the secure hardware registers 218 across the secure boundary of the secure subsystem 212. As discussed above, the system processor 236 may have access (e.g., the ability to read from and write to) to a subset of the secure hardware registers 218. By limiting access by the system processor 236 to secret data objects within the secure subsystem 212, the security of those secret data objects may be increased. The system processor 236 may execute storage system firmware 240. The storage system firmware 240 may define the operations that the system processor 236 can perform. Additionally, the storage system firmware 240 can define what commands may be submitted by the system processor 236 to the secure hardware registers 218 for execution by the secure processor 220. As such, the types and content of communication between the storage controller circuitry 214 and the secure subsystem 212 may be controlled and limited in order to increase the security of secret data objects stored in the secure subsystem 212.

The system hardware registers 238 may include a plurality of hardware registers. In various embodiments, the system hardware registers 238 may be general purpose registers in a register file. All of, or a subset of the system hardware registers 238 may be accessible by one or more components inside of the secure boundary of the secure subsystem 212, such as the secure processor 238. The components of secure subsystem 212 may write information to a subset of the system hardware registers 238, such as confirmation that a secure operation was successfully completed. While access by components of the secure subsystem 212 to the system hardware registers 238 may be limited to a subset of the system hardware registers 238, components external to the secure subsystem 212 (e.g., the system processor 236) may access all of the system hardware registers 238.

The host interface 244 can be in the form of a standardized interface or a specialized interface. For example, the host interface 106 can be a serial advanced technology attachment (SATA), peripheral component interconnect express (PCIe), or a universal serial bus (USB), among other connectors and interfaces. In general, the interface 106 provides a communication mechanism for passing control signals, address information, data, and other signals between the data storage system 202 and the host device 216. In various embodiments, the host interface 244 can receive write commands and data from the host device 216 to be encrypted and written to the storage media 210. The host interface 244 may receive read commands to decrypt and return data that is stored in the storage media 210.

The write data path control circuit 246 guides and controls write data flow from the host interface 244 to the encrypt circuit 230 in the secure subsystem 212. The write data path control circuit may be controlled by the system processor 236 executing the storage system firmware 240. For example, the host interface 244 may receive a write request and the data to be written to the storage media 210 from the host device 216. The system processor 236 may write an encrypt command to the secure hardware registers 218 to perform a write operation. The secure hardware registers 218 may notify the secure processor 220 executing the security firmware 222 that an encrypt command was received. The secure processor 220 may provide an encryption key to the encrypt circuit 230. The system processor 236 may instruct the write data path control circuit 246 to provide the data to be encrypted and stored to the encrypt circuit 230 across the secure boundary of the secure subsystem 212. The encrypt circuit 230 may then encrypt the received data using the encryption key provided by the secure processor 220. Accordingly, all secret data objects (e.g., the encryption key) remain within the secure subsystem 212 and are not accessible by components external to the secure subsystem 212. The encrypted data may then be provided to the media interface 250 in the memory/media interfaces 254 and stored on the storage media 210.

The read data path control circuit 248 guides and controls read data flow from the decrypt circuit 232 in the secure subsystem 212 to the host interface 244. The read data path control circuit 248 may be controlled by the system processor 236 executing the storage system firmware 240. For example, the host interface 244 may receive a read request from the host device 216 for data stored in the storage media 210 in an encrypted format. The system processor may write a read request for the identified data to the secure hardware registers 218 in the secure subsystem 212. The secure hardware registers 218 may notify the secure processor 220 executing the security firmware 222 that a read request has been received. The secure processor 220 may provide the encryption key associated with the requested data to the decrypt circuit 232. The decrypt circuit 232 may retrieve, via the media interface 250, the requested encrypted data from the storage media 210. The decrypt circuit 232 may then decrypt the requested data using the decryption key provided by the secure processor 220 and provide the decrypted data to the read data path control 248. The read data path control circuit 248 may provide the decrypted data to the host interface 244 which provides the decrypted data to the host device 216.

Figure 3:
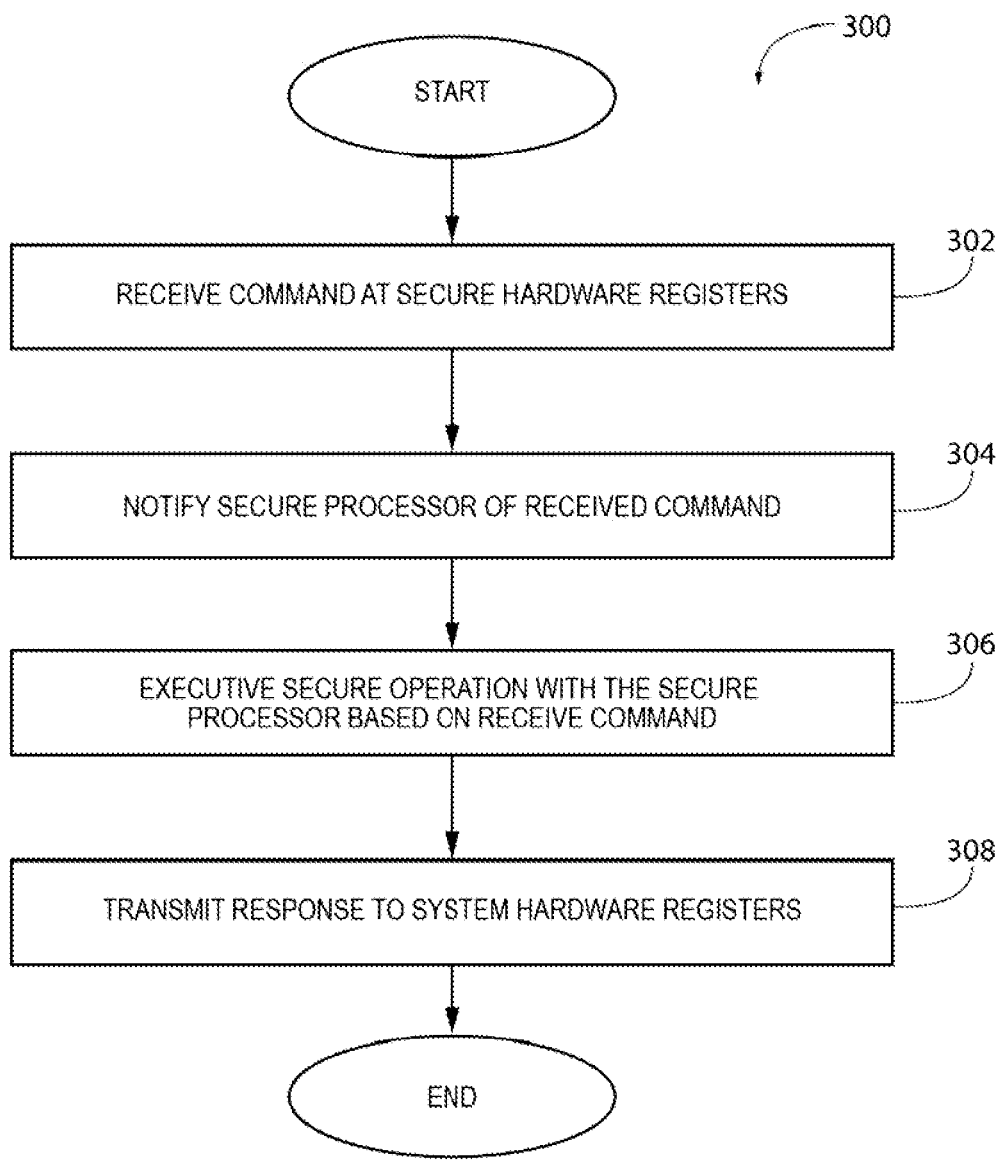
FIG. 3 is a flowchart depicting operational steps for performing secure operations, in accordance with the embodiment of FIG. 2.

FIG. 3 is a flowchart depicting operational steps, generally designated 300, for processing secure operations, in accordance with the embodiment of FIG. 2. In operation 302, the secure subsystem (e.g., secure subsystem 212) receives a command at one or more secure hardware registers (e.g., secure hardware registers 218). The command may be received from a device external to the secure subsystem, such as a system processor (e.g., system processor 236). The command may include instructions to execute a particular secure operation that implicates secret data objects, such as read or write commands which implicate encryption keys stored within the secure subsystem. The command may further include any necessary parameters for performing the secure operation. As discussed above with respect to FIG. 2, the command may be received at one or more of a subset of the secure hardware registers 218 that is accessible to the system processor 236. Those secure hardware registers which are not accessible by the system processor 236 cannot receive commands from the system processor 236. By limiting access to the secure hardware registers 218, the security of secret data objects stored within the secure subsystem 212 may be increased.

In operation 304, the secure subsystem 212 or a component thereof notifies the secure processor 220 that a command has been received. The secure hardware registers 218 may be configured to transmit a notification via an internal bus within the secure subsystem 212 to the secure processor 220 in response to receiving a command. The secure processor 220, executing the security firmware 222 may determine how the received command should be processed. As discussed above, the secure processor 220 may be limited to performing particular secure operations defined by the security firmware 222. In such embodiments, the secure processor 220 may only execute the requested command if it is permitted to by the security firmware 222. If the received command does not correspond to a permitted secure operation as defined by the security firmware 222, then the secure processor 220 may return an exception or an error indicating that the received command is unpermitted by the security firmware 222 by, for example, writing a description of the exception to system hardware registers 238.

Where the received command is a permitted command, the secure subsystem 212 executes a secure operation with the secure processor 220 and/or security assist hardware (e.g., security assist hardware circuit 224) based on the received command, in operation 306. The secure processor 220 may execute a secure operation requested by the received command (e.g., a write operation, a read operation, encryption/decryption operations, encryption key generation, etc.). Prior to, during, and following the execution of the secure operation, the secure subsystem 212 may ensure that all secret data objects remain within the secure boundary unless encrypted.

In operation 308, the secure subsystem 212 transmits a response to system hardware registers 238. The secure processor 220 may transmit the response across the secure boundary of the secure subsystem 212. In various embodiments, the response may be an appropriate value or set of values based on the received command. For example, the response may be an indication that the received command was completed successfully. The system processor 236 may read the value from the system hardware registers 238 and interpret the response.

Figure 4:
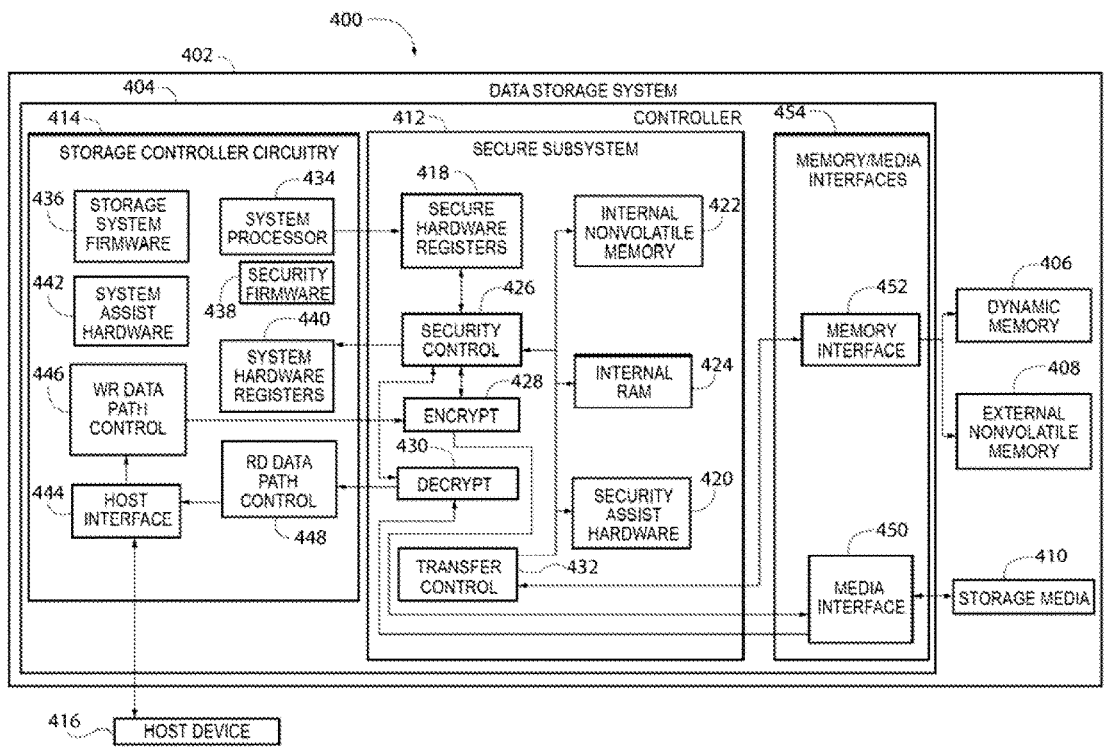
FIG. 4 is a functional block diagram of an apparatus including a data storage system with a secure subsystem, in accordance with an embodiment of the present invention.

FIG. 4 is a functional block diagram of an apparatus, generally designated 400, including a data storage system 402, in accordance with an embodiment of the present invention. The data storage system 402 may include a controller 404 including a secure subsystem 412, storage controller circuitry 414, and memory/media interfaces 454, a dynamic memory 406, an external nonvolatile memory 408, and storage media 410. In various embodiments, the memory media interfaces 454 (including memory interface 452 and media interface 450), the dynamic memory 406, the external nonvolatile memory 408, and the storage media 410 may be implemented as described above with respect to the memory/media interfaces 254 (including memory interface 252 and media interface 250), dynamic memory 206, the external nonvolatile memory 208, and the storage media 210 in the embodiment of FIG. 2 and/or the memory/media interfaces 118, the dynamic memory 106, the external nonvolatile memory 108, and the storage media 110 in the embodiment of FIG. 1, respectively. The data storage system 402 may be coupled to a host device 416. The host device 416 may be implemented as described above with respect to host device 116 and host device 216 in the embodiments of FIGS. 1 and 2, respectively. The controller 404 may be implemented as the controller 104 in FIG. 1.

In the embodiment of FIG. 4, the secure subsystem 412 includes a plurality of secure hardware registers 418, security assist hardware circuits 420, internal RAM 424, internal nonvolatile memory 422, a security control circuit 426, an encrypt circuit 428, a decrypt circuit 430, and a transfer control circuit 432. The secure hardware registers 418, the internal RAM 424, the internal nonvolatile memory 422, the encrypt circuit 428, the decrypt circuit 430, and the transfer control circuit 432 may be implemented as described above with respect to the secure hardware registers 218, the internal RAM 228, the internal nonvolatile memory 226, the encrypt circuit 230, the decrypt circuit 232, and the transfer control circuit 234, respectively, of the embodiment of FIG. 2. In the embodiment of FIG. 4, the security assist hardware circuits provide the functionality of performing secure operations within a secure boundary in the absence of a dedicated secure processor.

The security control circuit 426 provides communication functionality between components within the secure subsystem 412. Additionally, the security control circuit 426 may provide a communication path between the secure subsystem 412 and the storage controller circuitry 414. Specific functions of the security control circuit 426 are described in further detail below.

The security assist hardware circuits 420 may be a plurality of hardware circuits configured to fully execute discrete secure operations. Examples of discrete secure operations performed by the security assist hardware circuits 420 include, but are not limited to random number generation, encryption key generation, signature calculation, symmetric encryption or decryption], asymmetric encryption or decryption, data manipulation operations, and data movement operations. One or more security assist hardware circuits 420 may be triggered in response to the secure hardware registers 418 receiving a command, as described above with respect to FIG. 2. In certain embodiments, particular register locations in the secure hardware registers 418 may correspond to particular security assist hardware circuits 420. The secure hardware registers 418 may provide a notification, via the security control circuit 426, to one or more of the security assist hardware circuits 420 that a command (and any related parameters) was received at the secure hardware registers 418 for execution by the one or more security assist hardware circuits 420. Once the security assist hardware circuits 420 completes execution of the secure operation, the security assist hardware circuit 420 may provide a value indicating completion of the secure operation back to the secure hardware registers 418 or to the storage controller circuitry 414.

The security assist hardware circuit 420 may use, access, generate, or otherwise implicate secret data objects (e.g., encryption keys) that are kept within the secure subsystem 412 and/or inaccessible to components external to the secure subsystem 412 (e.g., the memory access hardware 414). To maintain the security of secret data objects, the security assist hardware circuit 420 may store the secret data objects in an internal memory system, such as the internal RAM 424, the internal nonvolatile memory 422, or register locations in the secure hardware registers 418 that are not accessible by the storage controller circuitry 414. The secret data objects may also be encrypted and stored in an external memory device, such as the dynamic memory 406 and/or the external nonvolatile memory 408, via the memory/media interfaces 454 so long as the keys for decrypting the secret data objects remains within the secure subsystem 412.

Examples of particular security assist hardware circuit 420 will now be discussed. It should be appreciated that this discussion is provided by way of example only, and additional circuits that perform different secure operations are possible without deviating from the scope of this disclosure.

In a first example, a security assist hardware circuit 420 enables random number generation. A command to generate a random number may be received at the secure hardware registers 418, which notify the applicable security assist hardware circuit 420. The security assist hardware circuit 420 may generate a sequence of random bits from a generator, accumulate the sequence of bits into a holding register of a defined length, condition the accumulated value according to a conditioning algorithm by, for example, a deterministic random bit generator, write the result into an internal memory location (e.g., internal RAM 424), and transmit a completion notification to the storage controller circuitry 414.

In a second example, a security assist hardware circuit 420 enables encryption key generation. Generation of encryption keys may depend on a previously generated secret data object, such as a random number produced by a random number generation security assist hardware circuit 420 that serves as an encryption key. The encryption key generation security assist hardware circuit 420 may implement any suitable transformation function to generate the encryption key. In operation, a component of the storage controller circuitry 414 may provide a command to generate an encryption key to the secure hardware registers 418 and supply an address to a previously generated random number, parameterize the transformation, and define a location for the resulting encryption key. The encryption key generation security assist hardware circuit 420 may perform the defined transformation on the random number at the designated location to generate the encryption key and store the resulting encryption key at the designated location. The encryption key generation security assist hardware circuit 420 may then transmit a notice, such as an event interrupt, to the storage controller circuitry 414 that the encryption key was successfully generated and the location of the encryption key.

In a third example, a security assist hardware circuit 420 enables signature calculation. A signature calculation security assist hardware circuit 420 may be employed for secure operations which require validation of information by affixing or checking a signature value. The storage controller circuitry 414 may write to the secure hardware registers 418 an operation code, an address of a value to be digitally signed or checked, a length of the value, parameters of the signature calculation itself, and a location for the resulting signature or signature check result. The signature calculation security assist hardware circuit 420 may then generate or check a signature value based on the provided parameters and store the result in the designated location. The signature calculation security assist hardware circuit 420 may then transmit a notice, such as an event interrupt, to the storage controller circuitry 414 that the signature value was successfully generated or checked and the location of the result.

In a fourth example, a security assist hardware circuit 420 enables symmetric encryption and/or decryption. A symmetric encryption security assist hardware circuit 420 may be used to conceal secret data objects or other data to be moved outside of the secure boundary of the secure subsystem 412. The storage controller circuitry 414 may access the secure hardware registers 418, define the operation (e.g., whether to encrypt or decrypt), define any operands (e.g., an encryption/decryption key), an initialization vector, if applicable, the location and length of the data to be encrypted/decrypted, and the location/length at which to store the result. The symmetric encryption security assist hardware circuit 420 may then transmit a notice, such as an event interrupt, to the storage controller circuitry 414 that the data was successfully encrypted/decrypted and the location of the result.

In a fifth example, a security assist hardware circuit 420 enables asymmetric encryption and/or decryption, such as public key/private key operations based on RSA or other algorithms. A symmetric encryption security assist hardware circuit 420 may be used to conceal secret data objects or other data to be moved outside of the secure boundary of the secure subsystem 412. The storage controller circuitry 414 may access the secure hardware registers 418, define the operation (e.g., whether to encrypt or decrypt), define any operands (e.g., an encryption and a decryption key), an initialization vector, if applicable, the location and length of the data to be encrypted/decrypted, and the location/length at which to store the result. The asymmetric encryption security assist hardware circuit 420 may then transmit a notice, such as an event interrupt, to the storage controller circuitry 414 that the data was successfully encrypted or decrypted and the location of the result.

In a sixth example, one or more security assist hardware circuits 420 may perform data manipulation functions. For example, data manipulation may include transferring a key value from a location that is not accessible by the storage controller circuitry 414 (e.g., internal RAM 424 or internal nonvolatile memory 422) to a location where the storage controller circuitry 414 may indirectly access the key value (e.g., the secure hardware registers 418).

In a seventh example, one or more security assist hardware circuits 420 may perform data movement functions. One example of a data movement security assist hardware circuit may be transfer control circuit 432, which supports data transfer between the secure subsystem 412 and external memory devices, such as the dynamic memory 406 and/or the external nonvolatile memory 408.

The storage controller circuitry 414 may include a system processor 434, storage system firmware 436, security firmware 438, system hardware registers 440, system assist hardware 442, a host interface 444, a write data path control circuit 446, and a read data path control circuit 448. The system processor 434, storage system firmware 436, system hardware registers 440, system assist hardware 442, host interface 444, a write data path control circuit 446, read data path control circuit 448 may be implemented as described above with respect to the system processor 236, the storage system firmware 240, the system hardware registers 238, the system assist hardware 242, the host interface 244, the write data path control circuit 246, the read data path control circuit 248, respectively, in FIG. 2.

The embodiment of FIG. 4 includes the security firmware 438 in the storage controller circuitry 414 and the system processor 434 is responsible for executing both the storage system firmware 436 and the security firmware 438. The security firmware 438 defines the particular secure operations that may be requested by the system processor 434 of the secure subsystem 412 to be executed by the security assist hardware circuits 420. Accordingly, the operations to be performed and access to secret data objects stored within the secure subsystem 412 may be maintained without requiring a dedicated secure processor within the secure subsystem 412.

Figure 5:
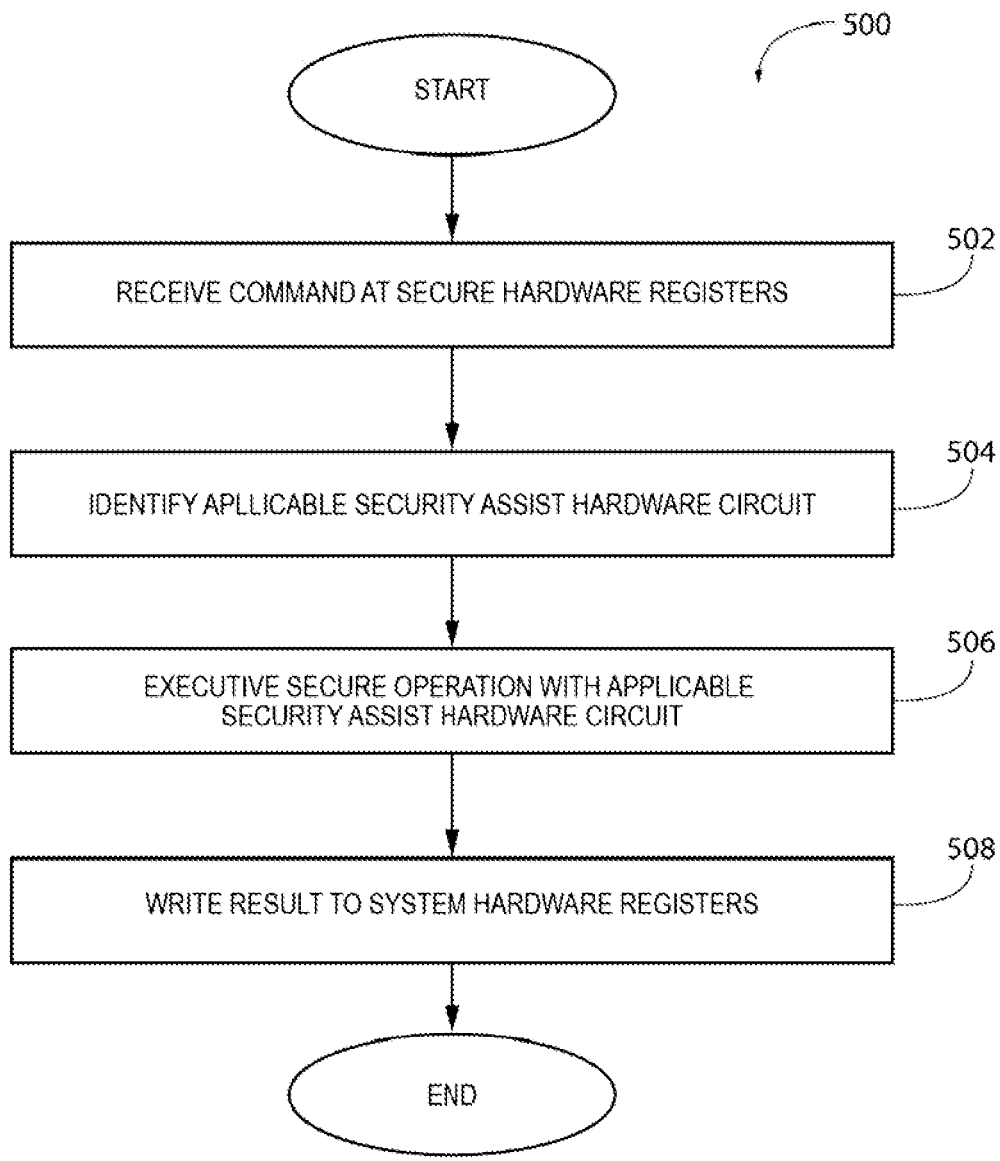
FIG. 5 is a flowchart depicting operational steps for performing secure operations, in accordance with them embodiment of FIG. 4.

FIG. 5 is a flowchart depicting operational steps, generally designated 500, for performing secure operations, in accordance with them embodiment of FIG. 4.

In operation 502, the secure subsystem 412 receives a command at one or more of the secure hardware registers 418. For example, the system processor 434, executing the security firmware 438, may transmit a command to perform one or more secure operations that create, move, modify, or otherwise implicate secret data objects maintained within the secure subsystem 412. In various embodiments, the system processor 434 may be limited to accessing a subset of the secure hardware registers 418. In operation 504, the secure subsystem 412 identifies one or more applicable security assist hardware circuits 410 to perform the secure operation. The secure subsystem 412 can identify the one or more applicable security assist hardware circuits, for example, by decoding the received command. In various embodiments, the received command may indicate a particular security assist hardware circuit 420 to perform the operation. In some embodiments, the command may be received at a particular secure hardware register 418 that corresponds to a particular security assist hardware circuit 420. In such embodiments, the security control circuit 426 may automatically transfer the received command to the applicable security assist hardware circuit 420 upon detecting receipt of the command.

In operation 506, the secure subsystem executes the requested command by performing a secure operation with the applicable security assist hardware circuit 420, or other components (e.g., encrypt circuit 428 or decrypt circuit 430). Various example security assist hardware circuits 420 for performing discrete secure operations are described above with respect to FIG. 4. In operation 508, the secure subsystem 412 writes a result to the system hardware registers 440. In various embodiments, the result may include a value indicating whether the secure operation was successfully completed and/or the location of any resultant data (e.g., decrypted data). The security control circuit 426 may provide the communication interface between the secure subsystem 412 and the system hardware registers 440.

Figure 6:
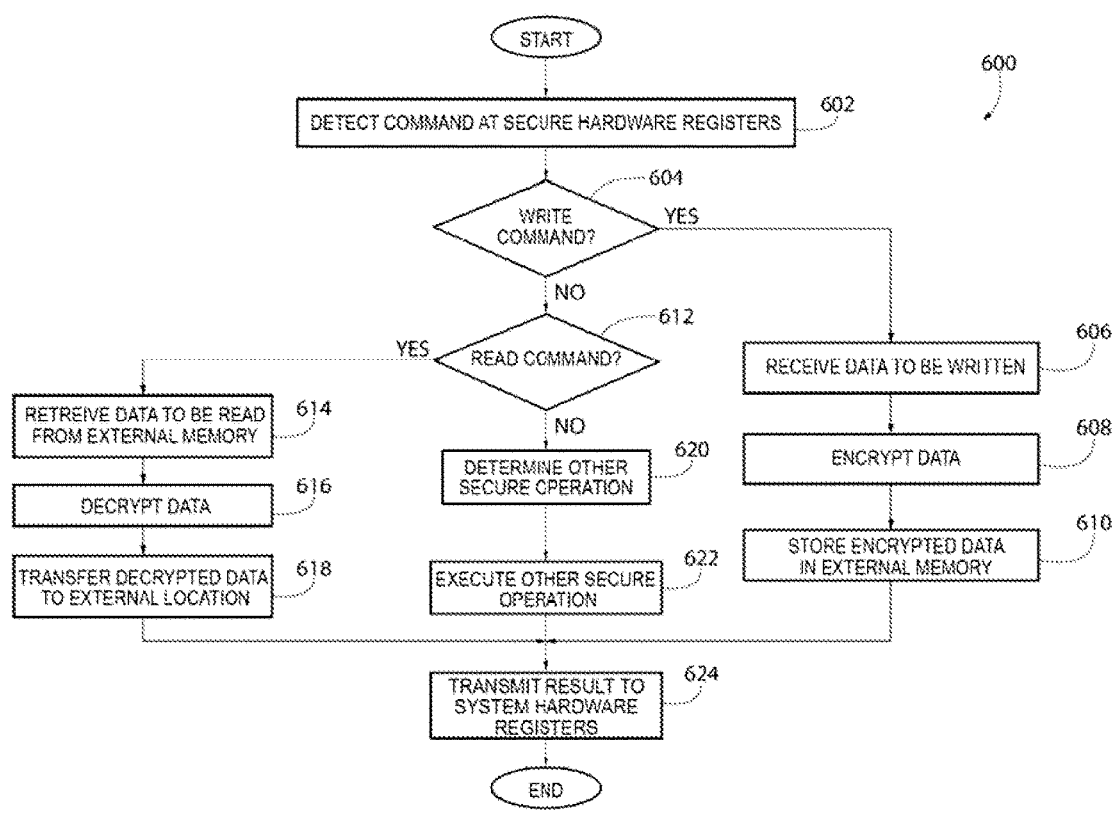
FIG. 6 is a flowchart depicting operational steps for performing secure operations, in accordance with an embodiment of the present invention.

FIG. 6 is a flowchart depicting operational steps, generally designated 600, for performing secure operations, in accordance with an embodiment of the present invention.

In operation 602, a secure subsystem receives a command at secure hardware registers (e.g., secure hardware registers 218, 418). In operation 604, the secure subsystem determines whether the received command is a write command. In various embodiments, the secure subsystem may determine whether the received command is a write command based on the format of the command as interpreted by a secure processor (e.g., secure processor 220) or by virtue of the particular hardware register to which the command was written. If the secure subsystem determines that the received command is a write command (decision block 604, YES branch), then the secure subsystem receives the data to be written, in operation 606. In operation 608, the secure subsystem encrypts the data, for example, using an encrypt circuit (e.g., encrypt circuits 230, 428). In operation 610, the secure subsystem stores the encrypted data in an external memory, such as storage media 210, 410. In operation 624, the secure subsystem transmits a result to the system hardware registers. In various embodiments, the result may include a value indicating that the data was successfully encrypted and written the storage media 210, 410.

If the secure subsystem determines that the received command is not a write command (decision block 604, NO branch), then the secure subsystem determines whether the received command is a read command in operation 612. If the secure subsystem determines that the received command is a read command (decision block 612, YES branch), then the secure subsystem retrieves the data to be read from an external memory device, such as storage media 210, 410 in operation 614. In operation 616, the secure subsystem decrypts the retrieved data, for example, using decrypt circuits 232, 430. In operation 618, the secure subsystem transfers the decrypted data to a location external to the secure subsystem. For example, the secure subsystem may provide the decrypted data to a read data path control circuit (e.g., read data path control circuits 248, 448). In operation 624, the secure subsystem transmits a result to the system hardware registers. In various embodiments, the result may include a value indicating that the data was successfully retrieved, decrypted, and provided to the read data path control circuit.

If the secure subsystem determines that the received command is not a read command (decision block 612, NO branch), then the secure subsystem determines what type of secure operation is requested by the command in operation 620. In operation 622, the secure subsystem executes a secure operation based on the determined type of operation. The secure operation may be executed by, for example, a secure processor, such as secure processor 220, or by one or more security hardware assist circuits, such as security hardware assist circuits 224, 420. In operation 624, the security subsystem transmits a result to the system hardware registers, which may indicate that the secure operation was successfully completed.

What is claimed is:

1. An apparatus comprising:
a memory device located within a secure boundary and configured to store one or more secret data objects;
a processor located within the secure boundary and configured to execute security firmware and perform a set of operations limited to a plurality of secure operations for manipulating the one or more secret data objects;
a plurality of secure hardware registers, accessible by the processor and configured to receive instructions to perform the plurality of secure operations; and
one or more security assist hardware circuits configured to perform discrete operations using the one or more secret data objects, wherein each of the plurality of secure hardware registers corresponds to a different security assist hardware circuit, the discrete operations comprising at least one of data encryption, data decryption, signature calculation and checking, and random number generation.

2. The apparatus of claim 1, further comprising:
security firmware stored on a memory device and defining a plurality of operations executable by the processor for manipulating one or more secret data objects.

3. The apparatus of claim 1, wherein the one or more secret data objects comprise at least one encryption key.

4. The apparatus of claim 1, further comprising:
an encrypt circuit configured to receive a plurality of data and encrypt the plurality of data based on one or more secret data objects.

5. An apparatus comprising:
an internal memory device for storing one or more secret data objects;
one or more secure hardware registers configured to receive a command to perform an operation using the one or more secret data objects; and
one or more security assist hardware circuits configured to perform discrete operations using the one or more secret data objects, wherein each of the one or more secure hardware registers corresponds to a different security assist hardware circuit, the discrete operations comprise at least one of random number generation, encryption key generation, signature calculation, signature verification, symmetric encryption, symmetric decryption, asymmetric encryption, and asymmetric decryption.

6. The apparatus of claim 5, wherein the secret data objects are inaccessible to devices outside of the apparatus.

7. The apparatus of claim 5, wherein the commands are received from a system processor executing security firmware stored on a memory external to the apparatus.

8. An apparatus comprising:
a secure subsystem configured to perform one or more secure operations involving one or more secret data objects, wherein the secure subsystem comprises:
a secure processor configured to execute security firmware and perform a set of operations limited to a plurality of secure operations for manipulating one or more secret data objects;

a plurality of secure hardware registers, accessible by the secure processor and configured to receive instructions to perform the plurality of secure operations; and one or more security assist hardware circuits configured to perform discrete operations using the one or more secret data objects, wherein each of the plurality of secure hardware registers corresponds to a different security assist hardware circuit, the discrete operations comprise at least one of random number generation, encryption key generation, signature calculation, signature verification, symmetric encryption, symmetric decryption, asymmetric encryption, and asymmetric decryption; and a memory access circuit configured to request that the secure subsystem perform the plurality of secure operations.

9. The apparatus of claim 8, further comprising:
one or more storage devices configured to store the one or more secret data objects.

10. The apparatus of claim 8, wherein the secure subsystem comprises:
security firmware stored on one or more memory devices and configured to control performance of the plurality of secure operations.

11. The apparatus of claim 8, wherein the memory access circuit comprises:
a system processor configured to request that the secure subsystem perform the plurality of secure operations.

12. The apparatus of claim 11, wherein the secure subsystem comprises:
storage system firmware for execution by the system processor and configured to control the request that the secure subsystem perform the plurality of secure operations.

13. The apparatus of claim 8, wherein the secure subsystem comprises:
an encryption circuit configured to encrypt data using the one or more secret data objects; and
a decryption circuit configured to decrypt data using the one or more secret data objects.

14. A method comprising:
receiving, at one or more of a plurality of secure hardware registers, a request to execute a secure operation using one or more secret data objects;
executing, with one of a plurality of security assist hardware circuits, the secure operation, the secure operation comprising at least one of random number generation, encryption key generation, signature calculation, signature verification, symmetric encryption, symmetric decryption, asymmetric encryption, and asymmetric decryption, wherein each secure hardware register of the plurality of secure hardware registers corresponds to a different security assist hardware circuit; and
transmitting to an unsecure hardware register, a value responsive to executing the secure operation, wherein the secure hardware register, the one or more secret data objects, and a dedicated secure processor are located within a secure boundary.

15. The method of claim 14, further comprising:
notifying the dedicated secure processor of the received request to execute the secure operation.

16. The method of claim 14, wherein the dedicated secure processor executes the secure operation based on dedicated security firmware stored on a memory device within the secure boundary.

17. The method of claim 16, wherein the dedicated security firmware defines a limited number of secure operations.

18. The method of claim 14, wherein executing the secure operation comprises:
encrypting data using the one or more secret data objects; and
storing the encrypted data in a storage device external to the secure boundary.

19. The method of claim 14, wherein executing the secure operation comprises:
retrieving encrypted data from a storage device external to the secure boundary; and
decrypting the encrypted data using the one or more secret data objects.

20. An apparatus comprising:
a memory access circuit configured to receive instructions to perform memory operations, wherein at least one of the memory operations manipulates a secret data object; and
a secure subsystem circuit configured to receive instructions from the memory access circuit to perform the at least one memory operation by manipulating the secret data object, wherein the secure subsystem circuit comprises:
a plurality of secure hardware registers configured to receive the instructions from the memory access circuit; and
a plurality of security assist hardware circuits configured to perform discrete operations using the one or more secret data object, wherein each of the one or more secure hardware registers corresponds to a different security assist hardware circuit, the discrete operations comprise at least one of random number generation, encryption key generation, signature calculation, signature verification, symmetric encryption, symmetric decryption, asymmetric encryption, and asymmetric decryption.

21. The apparatus of claim 20, wherein the secure subsystem circuit comprises a processor for performing a limited number of operations, wherein the limited number of operations includes the at least one memory operation manipulating the secret data object.

22. A method comprising:
receiving at one or more of a plurality of secure hardware registers located within a secure boundary of an integrated circuit, a request to execute a secure operation involving one or more secret data objects;
identifying one or more of a plurality of security assist hardware circuits configured to execute the secure operation, wherein each of the one or more secure hardware registers corresponds to a different security assist hardware circuit; and
executing the secure operation using the one or more identified security assist hardware circuits, the secure operation comprising at least one of random number generation, encryption key generation, signature calculation, signature verification, symmetric encryption, symmetric decryption, asymmetric encryption, and asymmetric decryption.

23. The method of claim 22, further comprising:
transmitting to an unsecure hardware register, a value responsive to executing the secure operation, wherein the one or more secure hardware registers, the one or more secret data objects, and the dedicated secure processor are stored on a memory within a secure boundary.

24. The method of claim 22, wherein the one or more secret data objects comprise one or more encryption keys.

25. The method of claim 22, wherein the request is received from a memory system processor executing security firmware.

\* \* \* \* \*